March 3, 1959 — W. STEUER ET AL — 2,876,015
HAND PIECE FOR DRILLING, MILLING OR GRINDING
Filed Sept. 8, 1954
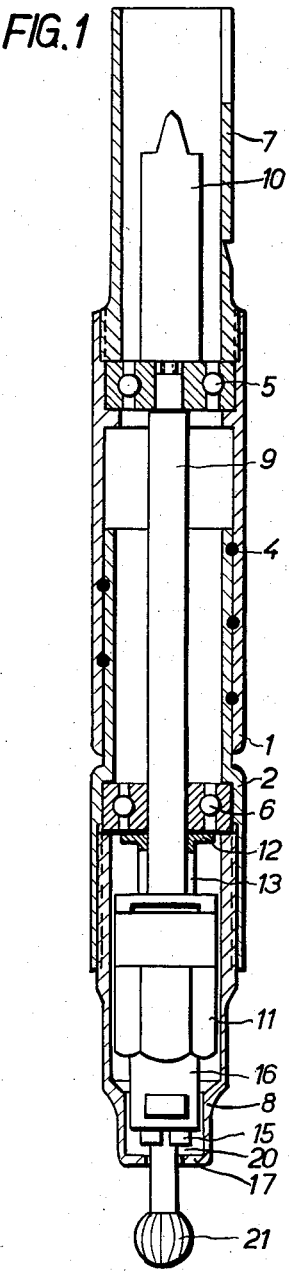
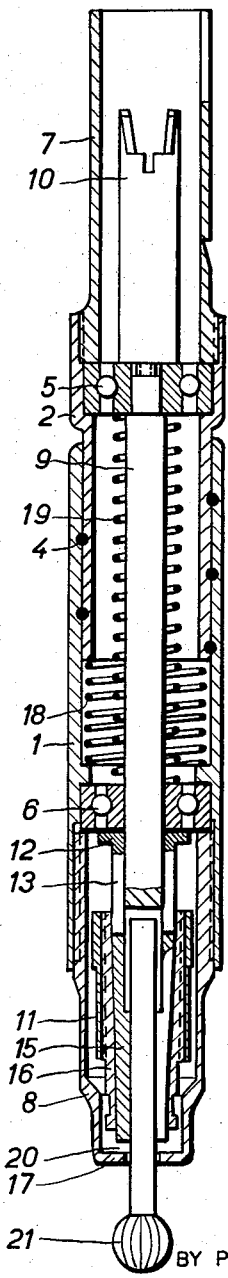
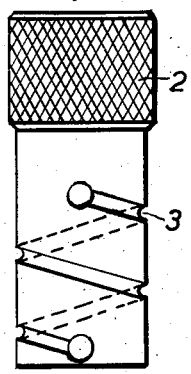
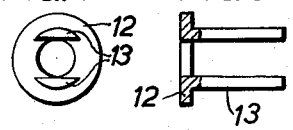
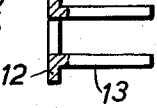
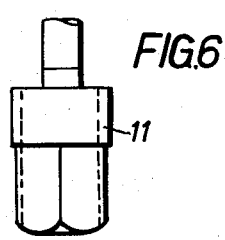
INVENTORS,
WERNER STEUER,
MORITZ RANG, DECEASED,
BY PAULA RANG, ADMINISTRATRIX
BY Connolly and *their* ATTORNEYS

United States Patent Office 2,876,015
Patented Mar. 3, 1959

2,876,015

HAND PIECE FOR DRILLING, MILLING OR GRINDING

Werner Steuer, Frankfurt am Main, Germany, and Moritz Rang, deceased, late of Frankfurt am Main, Germany, by Paula Rang, administratrix, Frankfurt am Main, Germany Application September 8, 1954, Serial No. 454,688

Claims priority, application Germany September 11, 1953

5 Claims. (Cl. 279—46)

The invention relates to a hand piece for drilling, milling or grinding tools, in particular for use in connection with a dental drilling machine and a so-called "Technikmotor" (i. e., a standard driving means for dental drilling machines) in dental laboratories with a slotted collet chuck at the end of the driving spindle carrying the tool. The spindle runs in two concentrically arranged handle sleeves telescopically screwed into each other. The bearing mounted in the handle sleeve at the driving end is not slidable relatively to the driving spindle; the bearing mounted in the handle sleeve at the chuck end is axially slidable on the spindle.

In the known devices of this kind, the movable bearing, for instance, a ball bearing, serves for operating the collet chuck. The inner race of the ball bearing is provided with a conical face engaging the collet. The closing and opening of the slotted collet is effected by the axial sliding movement of the bearing.

For keeping the movable ball bearing in its respective position, a strong spring is required abutting at one side against the inner race of the stationary ball bearing and at the other side against the inner race of the movable ball bearing. The operation of the strong compression spring requires quite an effort to be exerted.

The two handle sleeves telescopically screwed into each other are provided with self-locking fine threads and adjustable stops. These stops, which are essential for preventing blocking of the movable ball bearing, give rise to very great difficulties in practical use with respect to the re-adjustments when these become necessary owing to wear of the hand piece.

It has now been found that the disadvantages mentioned above can be overcome if, according to the invention, the movable bearing is secured in the handle sleeve 2 by means of a screw cap in such a manner that on drawing out the telescopic handle sleeves 1 and 2, the collet chuck 15 is tightened by means of the bearing 6, and that on pushing the handle sleeves 1 and 2 towards each other, the chuck is opened by means of the cap 8 whereby at the same time the bearing 6 is moved back into its initial position.

By this means it is brought about that the collet chuck can be operated for clamping the tool as well as for detaching it automatically without any danger of blocking the movable ball bearing and without requiring a stop for the handle sleeves. No readjustment becomes necessary because of wear.

It has been proved especially advantageous with regard to a quick exchange of tools to use threads of a high pitch for the telescopically arranged handle sleeves.

To ensure the proper clamping of the tool and to compensate for any play in the ball bearings and in the threads of both handle sleeves, it is advantageous to insert compression springs exerting pressure on the outer and inner races of the ball bearings. Therefore two compression springs are arranged around the spindle, one abutting at one end against the handle sleeve containing the stationary ball bearing and at the other end against the handle sleeve containing the movable ball bearing, and the other one abutting at one end against the inner race of the stationary ball bearing and at the other end against the inner race of the movable ball bearing.

For tightening the collet chuck, it is advantageous to insert an intermediate member between the movable ball bearing and the collet chuck in the form of an annular disc with two perpendicularly projecting parallel pins forming a fork which is slidable on the driving spindle, said disc engaging the inner race of the movable ball bearing. When shifting the ball bearing, the two pins pass through corresponding apertures in the head of the driving spindle in which the collet chuck is mounted, and press against the collet chuck and move it so as to effect a tightening. Instead of such an intermediate member it is possible to provide the collet chuck with pins extending through openings in the head of the driving spindle. When drawing out the handle sleeves the inner race presses directly against the pins of the collet chuck and moves the collet chuck into clamping position.

Two embodiments of the invention are illustrated by way of example in the accompanying diagrammatic drawing in which:

Fig. 1 shows a longitudinal section of a hand piece the tool collet chuck housing being shown in outline, Fig. 2 shows a longitudinal section of a similar hand piece with compression springs, Fig. 3 shows the handle sleeve at the driving end of Fig. 2, Figs. 4 and 5 are an elevation and a plan of the angular disc with the pins forming a fork, Fig. 6 is an elevational view of the head of the spindle, Fig. 7 is a plan of the head as seen from the driving end.

The hand piece according to Figs. 1 and 2 consists mainly of the concentrically arranged telescopically sliding handle sleeves 1 and 2, which differ only in so far as, in Fig. 1, the handle sleeve 1 is at the driving end, while in Fig. 2 it is secured to the cap on the tool head of the spindle.

The sleeve 2 has on its external face a spiral groove of high pitch and the sleeve 1 has a corresponding spiral groove on its internal face. A helical steel spring 4 is inserted in these grooves. By twisting the two sleeves in the sense of drawing out the handles or pushing the handles towards each other, a shortening or lengthening of the hand piece housing formed by these sleeves is obtained.

Ball bearings 5 and 6 are mounted in the open ends of the handle sleeves 1 and 2. They are secured at the driving end by an extension 7 screwed on to the sleeve and at the tool end by screwing on cap 8, both parts 7 and 8 engaging the outer races. The spindle 9 of the hand piece is held axially and radially in ball bearing 5 by screwing on coupling member 10. The ball bearing 6 is mounted for sliding movement on spindle 9. A disc 12 with parallel pins 13 is arranged between ball bearing 6 and head 11 of spindle 9 in such a way that both pins 13 pass through apertures 14 in head 11 and press against the non-slotted bottom of the tool collet chuck 15.

The head 11 is closed by the screwed-on internally coned sleeve 16. The hand piece as described above is now ready for use. Thus, on turning the handle sleeves 1 and 2 in opposite directions, the tool collect chuck 15, through ball bearing 6, disc 12 and parallel pins 13, is pressed into the internal coned sleeve 16 and is held there by its self-locking property. On turning the handle sleeves 1 and 2 in the other direction, ball bearing 6 is moved back into its initial position. At the same time the bottom 17 of cap 8 presses collet chuck 15 back so that it opens up while rotation may continue.

The purpose of the spiral spring 18 (Fig. 2) is to prevent lost motion in the telescoping parts as well as in the ball bearings while spiral spring 19 is inserted to prevent unintentional opening of the clamping mechanism during rough work. The spiral spring 18 should not press too strongly because the load on the bearings should be kept low.

A suitable clearance 20 (Figs. 1 and 2) is provided between the bottom 17 of cap 8 and the collet chuck 15, so that on detaching a tool, the pressure of the two spiral springs 18 and 19 is firstly removed and then the collet chuck 15 is forced out of its cone by a sharp tap so that practically no frictional heat and no wear can develop.

In the embodiment according to Fig. 1, the inserting and the detaching of tools can be carried out with one hand.

We claim:

1. A chucking device for a rotary tool comprising a drive-shaft housing, a chuck housing engaged to adjustably telescope with said drive-shaft housing, a rotatable spindle extending through said drive-shaft housing and said chuck housing, said chuck housing including an apertured wall disposed at its end remote from said drive-shaft housing, said spindle terminating in a tool-grasping head disposed adjacent said aperture in said chuck housing, a longitudinally movable ball bearing including a rotating inner race and a stationary outer race mounted within said chuck housing, said spindle extending through said inner race of said movable ball bearing, said inner race and said spindle being constructed and arranged to permit relative axial movement, the interior of said spindle head being cut out along its longitudinal axis to provide a tapering internal surface whose axis coincides with the axis of said spindle and which converges towards said aperture in said housing, a tapered collet inserted within said tapered aperture in said head and including an externally tapered surface which substantially coincides with said internally tapered surface within said head, projecting means attached to said inner race and extending towards said head, said projecting means and said collet being constructed and arranged to contact each other, resilient means reacting longitudinally between said inner race and said spindle in a direction to maintain said projecting means urged into forceful engagement with said collet to cause said collet to be compressed against said internally tapered surface within said head and firmly grasp an inserted tool, the end of said collet adjacent said apertured end of said chuck housing extending through the end of said head to assume a position a predetermined clearance distance from said apertured end when said housings are telescoped a normal predetermined extent, and said chuck housing and said drive-shaft housing being capable of being telescoped to an extent greater than said normal predetermined extent which moves said projecting means and said movable ball bearing along said spindle away from said head against the force of said resilient means and which causes said apertured end of said chuck housing to strike the adjacent end of said collet to drive said collet out of engagement with said head thereby releasing said tool.

2. A chucking device as set forth in claim 1 wherein a stationary ball bearing including a rotating inner race and a stationary outer race is mounted within said drive-shaft housing, said spindle being secured to said inner race of said stationary ball bearing, and said resilient means includes a compression spring mounted about said spindle and reacting between the inner races of said movable and said stationary ball bearings.

3. A chucking device as set forth in claim 2 wherein a larger diameter compression spring reacts between opposite surfaces of said housings to take up any lost motion between said housings.

4. A chucking device as set forth in claim 1 wherein the surface of said head adjacent said projecting means is cut out to provide an aperture connected with said internally tapered surface, and said projecting means includes a pin constructed and arranged to pass through said aperture into engagement with said end of said collet when said housings are telescoped to said normal predetermined extent.

5. A chucking device as set forth in claim 4 wherein said surface of said head adjacent said projecting means is cut out at diametrically opposed portions to provide a pair of said apertures, and said projecting means includes a disc attached to said inner race of said movable bearing and a pair of pins constructed and arranged to pass through said pair of apertures into engagement with said end of said collet.

References Cited in the file of this patent
UNITED STATES PATENTS
462,530   Booth _____ Nov. 3, 1891